US007527739B2

(12) United States Patent
Jiang et al.

(10) Patent No.: US 7,527,739 B2
(45) Date of Patent: May 5, 2009

(54) APPARATUS, SYSTEM, AND METHOD FOR MULTISTAGE WATER SEPARATION

(75) Inventors: Zemin Jiang, Cookeville, TN (US); Ted S. Loftis, Cookeville, TN (US); Mark J. Johnson, Cookeville, TN (US); Barry M. Verdegan, Stoughton, WI (US)

(73) Assignee: Fleetguard Inc, Nashville, TN (US)

( * ) Notice: Subject to any disclaimer, the term of this patent is extended or adjusted under 35 U.S.C. 154(b) by 662 days.

(21) Appl. No.: 11/204,302

(22) Filed: Aug. 15, 2005

(65) Prior Publication Data
US 2007/0039865 A1 Feb. 22, 2007

(51) Int. Cl.
*B01D 27/14* (2006.01)
*B01D 29/00* (2006.01)

(52) U.S. Cl. .............. 210/702; 210/788; 210/799; 210/806; 210/259; 210/304; 210/314; 210/315; 210/316; 210/317; 210/337; 210/338; 210/489; 210/512.1; 210/DIG. 5

(58) Field of Classification Search ............ 210/259, 210/304, 314, 315, 316, 317, 337, 338, DIG. 5, 210/702, 788, 799, 806, 489, 512.1
See application file for complete search history.

(56) References Cited

U.S. PATENT DOCUMENTS

| 3,481,473 | A | * | 12/1969 | Howard | 210/316 |
| 3,506,127 | A | * | 4/1970 | Gammon | 210/316 |
| 4,298,465 | A | * | 11/1981 | Druffel | 210/304 |
| 4,372,847 | A | * | 2/1983 | Lewis | 210/315 |
| 4,502,956 | A | * | 3/1985 | Wilson et al. | 210/315 |
| 4,588,500 | A | * | 5/1986 | Sprenger et al. | 210/DIG. 5 |
| 6,569,330 | B1 | * | 5/2003 | Sprenger et al. | 210/315 |

* cited by examiner

*Primary Examiner*—David A Reifsnyder
(74) *Attorney, Agent, or Firm*—Kunzler & McKenzie (57) ABSTRACT

An apparatus, system, and method are disclosed for multistage water separation. A first separation layer separates water droplets from a fuel flow by repelling the first water droplets. A coalescing layer may coalesce fine water droplets in the fuel flow. In one embodiment, a centrifugal separator directs the fuel flow tangentially to a filter wall and the centrifugal force of the fuel flow directed tangentially along the filter wall biases water droplets from the fuel flow. A second separation layer separates second water droplets from the fuel flow.

36 Claims, 11 Drawing Sheets

APPARATUS, SYSTEM, AND METHOD FOR MULTISTAGE WATER SEPARATION

BACKGROUND OF THE INVENTION

1. Field of the Invention

This invention relates to separating water and more particularly relates to multistage water separation and fuel filtration.

2. Description of the Related Art

Hydrocarbon-based liquid fuels such as diesel fuel frequently include quantities of water. The water may be emulsified in the fuel and present in the form of water droplets. Internal combustion engines such as diesel engines typically separate the water from the fuel before combusting the fuel. A fuel water separator ("FWS") or a fuel water coalescer may be used to separate the free and emulsified water from the fuel. Separating the water from the fuel improves and enhances the performance of the engine by reducing corrosion and erosion.

There are two general categories of devices used to separate water from fuel: single stage stripping FWS and two-stage fuel water coalescing-stripping FWS. Both single stage and two stage FWS are effective for removing both free and emulsified water from Number 2 diesel fuel, although two stage FWS tend to be more effective for removing finer droplets. In general, the water removal efficiency of FWS is reduced when ultra low sulfur diesel fuel or Biodiesel fuel is used instead of Number 2 diesel fuel. In the United States, ultra low sulfur diesel ("ULSD") fuel is being introduced for 2007 on-highway applications while Biodiesel fuel is increasingly used due to environment benefits and emission solution regulations The single stage FWS typically includes a filter media comprising a relatively hydrophobic surface. The filter media is placed in the fuel flow. The hydrophobic surface of the filter media strips water droplets from the fuel flow. The stripped water may then be collected in a reservoir and drained from the FWS.

The hydrophobic surface of the filter media can effectively strip the water from standard diesel fuel. Unfortunately, the hydrophobic surface cannot adequately strip sufficient water from many newer diesel fuel blends due to the small size and stability of water droplets in them. For example, ULSD and Biodiesel that are increasingly used by diesel engines have higher water content due to their lower interfacial tension. As a result, Biodiesel and ULSD require a FWS that supports a higher level of water separation.

Two-stage FWSs consist of a first coalescer stage consisting of a fibrous matrix of filter media, typically with hydrophilic or intermediate wetting characteristics. In the first stage, water droplets are captured by the coalescer media and held. Captured drops then grow in size by coalescence with other droplet until they become large enough that viscous forces cause the enlarged droplets to be released from the fibrous matrix. Unlike a single stage FWS, water droplets in a fuel water coalescer flow through the first stage rather than drain off its surface. Coalesced drops are then stripped from the fuel by the second separator stage. The second stage is similar to the single stage of an FWS and serves the same function, that is, to remove water droplets from the fuel.

Unfortunately, a FWS constructed of traditional filter media to separate water from Biodiesel and ULSD fuel may not separate sufficient water to protect an engine from corrosion and erosion. On the other hand, a two-stage FWS may be capable of removing finer droplets from Biodiesel and ULSD fuel, but they tend to be too restrictive for suction side applications and tend to have shortened life. In addition, both single and two stage FWS may require physical dimensions significantly larger than existing FWS.

From the foregoing discussion, it should be apparent that a need exists for an apparatus, system, and method that separate water more effectively from fuel. In particular, the apparatus, system, and method would separate sufficient water from Biodiesel and ULSD fuels. Beneficially, such an apparatus, system, and method would allow a FWS with substantially the physical dimensions of an existing FWS to separate water from Biodiesel and ULSD fuels. In addition, the apparatus, system, and method may reduce the size of the FWS required to separate water from standard diesel fuel.

SUMMARY OF THE INVENTION

The present invention has been developed in response to the present state of the art, and in particular, in response to the problems and needs in the art that have not yet been fully solved by currently available water separation methods. Accordingly, the present invention has been developed to provide an apparatus, system, and method for multistage water separation that overcome many or all of the above-discussed shortcomings in the art.

The present invention comprises a two or more stage separator stage FWS in which the first stage is a separation layer, rather than a coalescer, as in the prior art. In the art, it is known that fuel water coalescers, also known as two stage FWS, remove both fine and coarse water droplets, but that the pressure drop is excessive for low-pressure applications. Further, fuel water coalescers tend to have shortened life due to solids plugging.

Cellulose prefilters have been used upstream of fuel water coalescers to extend their life, but these have not been shown to improve water removal and further increase pressure drop. Traditional single stage FWS, on the other hand, are most effective for removing larger droplets and free water, hence tend not to be used for pressure side applications. Traditional single stage FWS remove water by physically blocking droplets larger than the pore size of the filter media, while finer droplets pass through the separator. In the development of a new FWS, the inventors observed relatively coarse droplets exiting some separators, contrary to expectations. Further, these coarse droplets were formed by coalescence, not by a failure of the separator to capture these drops.

The current invention exploits this phenomenon by using a first hydrophobic separation layer to strip water droplets from the fuel and to initiate coalescence of some the remaining finer droplets that penetrate the surface of this layer. Optionally, removal can be further enhanced by placing a coalescing layer immediately downstream of and in direct contact with the first separation layer. The resultant enlarged droplets released from the first separation layer and/or the coalescing layer, are then removed by a second hydrophobic separation layer. The use of the two-stage separator results in unexpectedly greater removal than traditional single stage FWS and lower pressure drop than fuel water coalescers.

The apparatus to separate water is provided with components configured to functionally execute the necessary steps of separating water droplets by repelling first water droplets and separating second water droplets. These components in the described embodiments include a first separation layer, a coalescing layer, and a second separation layer.

The first separation layer separates first water droplets from a fuel flow. In one embodiment, the first separation layer comprises a relatively hydrophobic matrix. In addition, the first separation layer may be configured to allow fuel to flow through the first separation layer. The first separation layer may strip or repel the first water droplets from the fuel flow as the fuel flow passes through the first separation layer. The stripped water droplets may be collected and drained.

The coalescing layer may coalesce fine water droplets that remain in the fuel flow into larger water droplets. In one embodiment, the coalescing layer is configured as a relatively hydrophilic matrix. The hydrophilic matrix may coalesce the fine water droplets into lager second water droplets. In other embodiments, the coalescing layer is configured as a matrix of intermediate hydrophobicity. In a certain embodiment, the first separation layer is physically laminated to the coalescing layer in a multilayer structure of filter media.

The second separation layer separates the coalesced second water droplets from the fuel flow by repelling the second water droplets. The second separation layer may also comprise a relatively hydrophobic matrix and allow the fuel to flow through the second separation layer while repelling or stripping the second water droplets from the fuel. The stripped water droplets may further be collected and drained. The apparatus removes an increased quantity of water from the fuel flow by stripping water, coalescing fine water droplets, and stripping the coalesced water droplets.

A system of the present invention is also presented to separate water. The system may be embodied in a fuel system of an internal combustion engine. In particular, the system, in one embodiment, includes a filter element and a filter housing.

The filter housing may be admit a fuel flow through an intake port and direct the fuel flow through the filter element. In addition, the filter housing may be sealed to prevent the escape of the fuel flow. The filter housing may further comprise an exit port configured to allow the fuel flow to flow from the filter housing. The filter element may be enclosed within the filter housing. The filter housing may include a filter wall.

The filter element comprises a first filter cartridge that separates water droplets from the fuel flow. The first filter cartridge may include a coalescing layer that coalesces fine water droplets that remain in the fuel flow into larger water droplets. The filter element further comprises a second filter cartridge that separates the coalesced water droplets from the fuel flow.

In one embodiment, the system further includes a centrifugal separator. The centrifugal separator may direct the fuel flow tangentially to the filter wall, biasing the water droplets against the filter wall. Biasing the water droplets against the filter wall may separate the water droplets from the fuel flow. In one embodiment, the centrifugal separator is disposed along the fuel flow between the first and second filter cartridge.

A method of the present invention is also presented for separating water. The method in the disclosed embodiments substantially includes the steps necessary to carry out the functions presented above with respect to the operation of the described apparatus and system. In one embodiment, the method includes separating water droplets by repelling first water droplets and separating second water droplets. The method may also include coalescing fine water droplets.

A first separation layer separates water droplets from a fuel flow by repelling the water droplets. A coalescing layer may coalesce fine water droplets from the fuel flow. In one embodiment, a centrifugal separator directs the fuel flow tangentially to a filter wall. The centrifugal force of the fuel flow directed tangentially along the filter wall biases water droplets from the fuel flow. A second separation layer separates second water droplets from the fuel flow.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention separates water from a fuel flow by separating first water droplets from the fuel flow and separating second water droplets. In addition, the present invention may separate water from the fuel flow with a reduced filter volume. Thus the present invention may remove water from low interfacial tension fuels such as biodiesel and ULSD with a traditional FWS volume and support the removal of water from a standard diesel fuel with a FWS volume smaller than the traditional volume. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
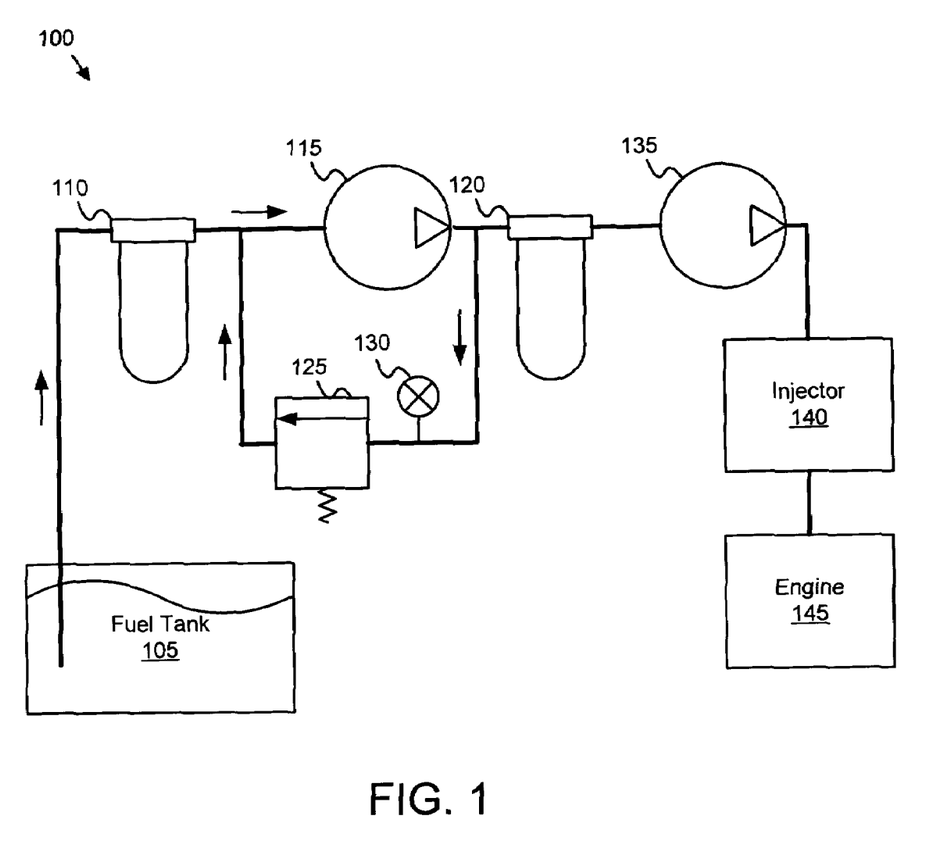
FIG. 1 is a schematic block diagram illustrating one embodiment of a fuel system of an internal combustion engine in accordance with the present invention.

FIG. 1 is a schematic block diagram illustrating one embodiment of a fuel system 100 of an internal combustion engine in accordance with the present invention. The system 100 includes a fuel tank 105, a FWS 110, a low-pressure pump 115, a fuel filter 120, a regulator 125, a pressure sensor 130, a high-pressure pump 135, an injector 140, and an engine 145.

The low-pressure pump 115 draws fuel from the fuel tank 105 through the FWS 110. The FWS 110 is configured to strip or remove water from the fuel. The regulator 125 regulates the pressure of the fuel exiting the low-pressure pump 115. In one embodiment, the regulator 125 diverts fuel from downstream of the low-pressure pump 115 if the pressure of the fuel exiting the low-pressure pump 115 exceeds a specified pressure.

The low-pressure pump 115 further impels the fuel through the fuel filter 120. The fuel filter 120 may remove contaminants from the fuel. The high-pressure pump 135 impels the fuel through the injector 140. The injector 140 may inject the fuel within the engine 145 where in fuel is combusted.

In one embodiment, the system 100 is a diesel fuel system and the engine 145 is a diesel engine 145. The fuel tank 105 may store diesel fuel. The injector 140 may inject the fuel within the combustion chamber of the diesel engine 145.

The FWS 110 removes water from the fuel to reduce corrosion and erosion of the engine 145 by water in the fuel. Unfortunately, some fuels such as biodiesel and ULSD have a significantly lower interfacial tension than standard diesel fuels such as Number Two Diesel. This results in decreased water droplet size and a more stable water in fuel emulsion in biodiesel and ULSD than standard diesel fuels. A more efficient FWS 110 is needed to remove the smaller water droplets from biodiesel and ULSD. The present invention separates sufficient water from high-water-content fuels such as biodiesel and ULSD while supporting a smaller FWS 110 for traditional diesel fuels.

Figure 2:
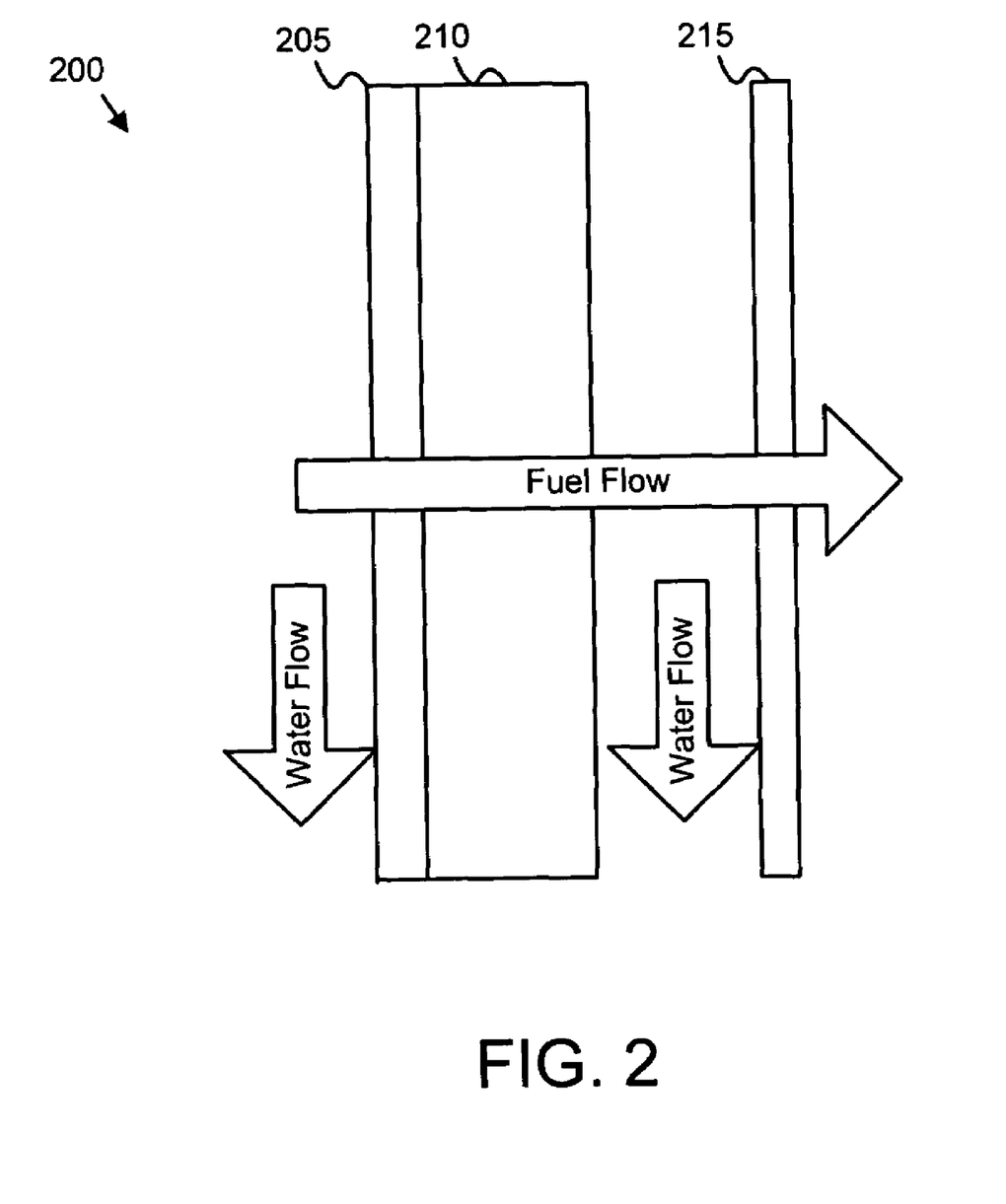
FIG. 2 is a schematic block diagram illustrating one embodiment of a water separation apparatus of the present invention.

FIG. 2 is a schematic block diagram illustrating one embodiment of a water separation apparatus 200 of the present invention. The FWS 110 of FIG. 1 may comprise the apparatus 200. As depicted, the apparatus 200 includes a first separation layer 205, a coalescing layer 210, and a second separation layer 215.

The first separation layer 205 may be configured to allow fuel to flow through the first separation layer 205. In addition, the first separation layer 205 separates first water droplets from a fuel flow. In one embodiment, gravity may motivate the separated first water droplets to move from the stream of the fuel flow. The separated first water droplets may be collected and drained from the FWS 110.

A first filter media may comprise the first separation layer 205. In one embodiment, the first filter media comprises multiple layers of filter material. The first layer is the separator layer and comprises a thin layer of melt blown polyester supported by a second layer of spun bond polyester. The third layer may be the coalescing layer 210 and comprise a cellulose filter media laminated onto the downstream side of the second layer.

In one embodiment, the first separation layer 205 comprises a hydrophobic matrix. The hydrophobic matrix may repel the first water droplets from the fuel flow as the fuel flow passes through the first separation layer 205. In one embodiment, the hydrophobic matrix is strongly hydrophobic. In an alternate embodiment, the hydrophobic matrix is weakly hydrophobic. The stripped water droplets may be collected and drained.

In a high-water-content fuel such as biodiesel, ULSD, and the like, significant quantities of water may remain in the fuel flow subsequent to fuel flow passing through the first separation layer 205. In addition, the remaining water droplets may be too fine to be readily removed by a hydrophobic matrix, but may be of sufficient quantity to corrode and erode an engine 145 such as the engine 145 of FIG. 1.

In one embodiment, the coalescing layer 210 coalesces the fine water droplets that remain in the fuel flow into larger water droplets. In a certain embodiment, the coalescing layer 210 is configured as a hydrophilic matrix. In another embodiment, the coalescing layer is configured as a matrix of intermediate hydrophobicity. In each embodiment, the matrix may coalesce the fine water droplets into larger water droplets by capturing fine water droplets. Fine water droplets may adhere to the matrix, coalescing with other fine water droplets until the coalesced water droplets become large enough to be forced from the matrix. In a certain embodiment, the coalescing layer 210 is physically laminated to the first separation layer 205 in the multilayer structure of the filter media.

The second separation layer 215 separates second water droplets from the fuel flow by repelling the second water droplets. In one embodiment, the second water droplets include the coalesced water droplets. The second separation layer 215 may also comprise a hydrophobic matrix and allow the fuel to flow through the second separation layer 215 while repelling or stripping the water droplets from the fuel. The separated second water droplets may further be collected and drained.

A second filter media may comprise the second separation layer 215. In one embodiment, the second filter media comprises multiple layers of filter material such as the materials of the first filter media. In one embodiment, the first separation layer 205 and the second separation layer 215 provide two-stage filtration by retaining contaminants. For example, the hydrophobic matrix of the first and second separation layers 205, 215 may filter particulates from the fuel.

In one embodiment, the apparatus 200 further comprises a plurality of separation layer/coalescing layer pairs. For example, the apparatus 200 may separate water, coalesce water, separate water, coalesce water, and finally separate water through three separating layers and two coalescing layers. The apparatus 200 removes an increased quantity of water from the fuel flow by separating the first water droplets and then again separating the second water droplets.

Figure 3:
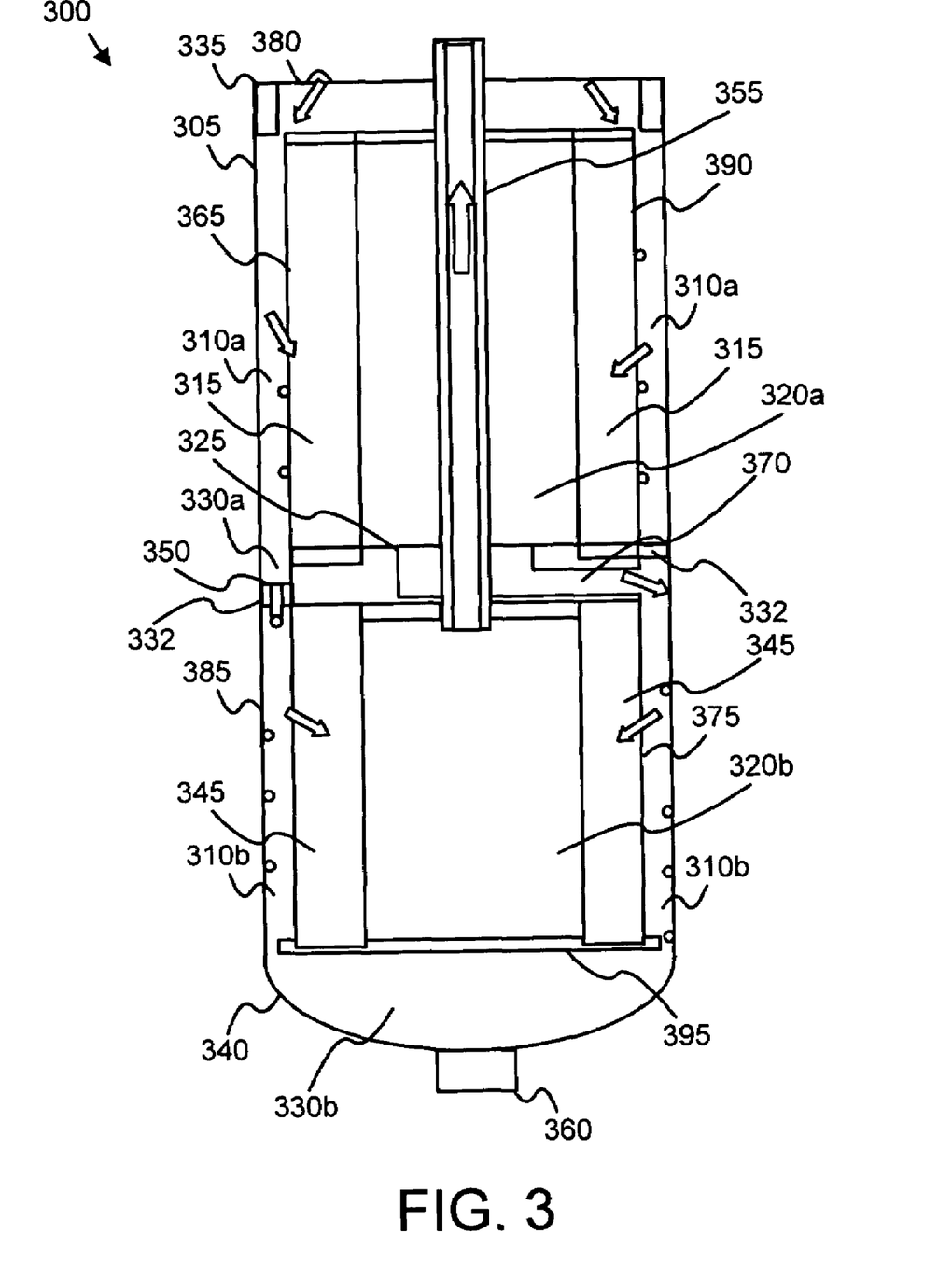
FIG. 3 is a schematic block diagram illustrating one embodiment of a top/bottom FWS of the present invention.

FIG. 3 is a schematic block diagram illustrating one embodiment of a top/bottom FWS 300 of the present invention. The FWS 300 may be the FWS 110 of FIG. 1. As depicted the FWS 300 includes a filter housing 385 comprising a filter wall 305, a proximal end 335, and a distal end 340. The proximal end 335 may comprise an intake port 380. The intake port 380 is configured to allow fuel to enter the FWS 300. For example, the low-pressure pump 115 of FIG. 1 may draw fuel from the fuel tank 105 of FIG. 1 to the intake port 380.

The filter housing 385 may be sealed so that fuel may only enter the FWS 300 through the intake port 380 and leave through an exit port 355. For example, the proximal end 335 and/or distal end 340 may be configured to be sealed and unsealed to the filter wall 305, allowing a filter element 390 to be removed and replaced. The proximal end 335 and/or distal end 340 may also be permanently sealed to the filter wall 305.

The fuel flows into a first outer cavity 310a. The filter wall 305 and a first filter media 315 may form the first outer cavity 310a. Arrows indicate the direction of the fuel flow. The fuel further flows from the first outer cavity 310a through the first filter media 315. In one embodiment, a first filter cartridge 365 comprises the first filter media 315. The first filter media 315 may have a multilayer structure, with one or more layers of filtering media material. In addition, the first filter media 315 may comprise a first separation layer 205 and a coalescing layer 210 such as the first separation layer 205 and coalescing layer 210 of FIG. 2. The coalescing layer 210 may be physically laminated to the first separating layer 205.

The first separation layer 205 separates or repels first water droplets from the fuel flow as the fuel passes through the first filter media 315. Gravity may motivate the separated first water droplets to flow down the first filter media 315 to a first sedimentation chamber 330a. In a certain embodiment, a sedimentation chamber barrier 332 forms a gasket preventing fuel from flowing from the first outer cavity 310a to the second outer cavity 310b. The sedimentation chamber barrier 332 may comprise a porous, fibrous, hydrophilic material.

A drain 350 may drain the collected first water droplets from the first sedimentation chamber 330a. In one embodiment, the collected first water droplets drain into a second outer cavity 310b. In an alternate embodiment, the collected first water droplets drain from the FWS 300.

As the fuel flows through the first filter media 315, the coalescing layer 210 may coalesce fine water droplets in the fuel flow into second water droplets. The coalesced second water droplets may be more easily removed from the fuel flow. The fuel and the coalesced second water droplets may pass through the first filter media 315 to a first inner cavity 320a.

In one embodiment, a centrifugal separator 325 is disposed along the fuel flow from the first inner cavity 320a. The centrifugal separator 325 may direct the fuel flow with coalesced second water droplets into a second outer cavity 310b tangentially to the filter wall 305 through a tangential port 370. The filter wall 305 and a second filter media 345 may form the second outer cavity 310b. The tangential motion of the fuel centrifugally biases water droplets against the filter wall 305 because the water droplets are denser than the fuel. For example, water is denser than diesel fuel. The water droplets such as the coalesced second water droplets may be separated from the fuel flow when biased against the filter wall 305. Gravity may motivate the separated water drops down the filter wall 305 to a second sedimentation chamber 330b. In the depicted embodiment, the second sedimentation chamber 330b is comprised by the distal end 340 of the filter housing 385.

The fuel flow passes from the second outer cavity 310b through the second filter media 345. A second filter cartridge 375 may comprise the second filter media 345. In addition, the second filter cartridge 375 may include an end cap 395. The second filter media 345 includes a second separation layer 215 such as the second separation layer 215 of FIG. 2. The second filter media 345 may also include a coalescing layer 210.

The second separation layer 215 separates the coalesced second water droplets from the fuel flow by repelling the second water droplets. Gravity may motivate the separated second water droplets down the second filter media 345 to the second sedimentation chamber 330b. In one embodiment, the second sedimentation chamber 330b comprises a sump to hold the water.

The fuel flow passes through the second filter media 345 into a second inner cavity 320b. In addition, the fuel flow may exit the FWS 300 through the exit port 355. The end cap 395 may prevent fuel from escaping the second inner cavity 320b except through the exit port 355. In one embodiment, the water collected in the second sedimentation chamber 330b is drained from the FWS 300 through a drain port 360.

In one embodiment, the first filter cartridge 365 and the second filter cartridge 375 comprise the filter element 390. In a certain embodiment, the filter element 390 further comprises the centrifugal separator 325. The filter element 390 and filter housing 385 may comprise a disposable unit. The FWS 300 may be serviced by replacing the entire FWS 300.

In an alternate embodiment, the filter housing 385 may be unsealed and the filter element 390 removed from the filter housing 385. The filter element 390 may be configured as a replaceable cartridge. In a certain embodiment, the filter housing 385 is configured as a disposable spin-on filter, wherein the intake port 380 and exit port 355 are engaged by attaching a single threaded connection.

Although the FWS 300 is depicted with a first and second filter media 315, 345, the FWS 300 may employ any number of filter media 315. For example, the FWS 300 may comprise two or more filter media 315, each comprising a separation layer 205. In addition, each filter media may comprise a coalescing layer 210. The filter media 315 may be disposed in a top-to-bottom stack with the fuel flow entering the top-most filter media 315 and progressing through each filter media 315 to the bottom-most filter media 315. In an alternate embodiment, the fuel flow may enter the bottom-most filter media and progress through each of a plurality of filter media 315 to the top-most filter media 315.

The FWS 300 removes water from the fuel flow by separating first water droplets, coalescing fine water droplets into second water droplets, and separating the second water droplets. The FWS 300 may reduce the volume of FWS 300 required to separate a specified quantity of water from fuel.

Figure 4:
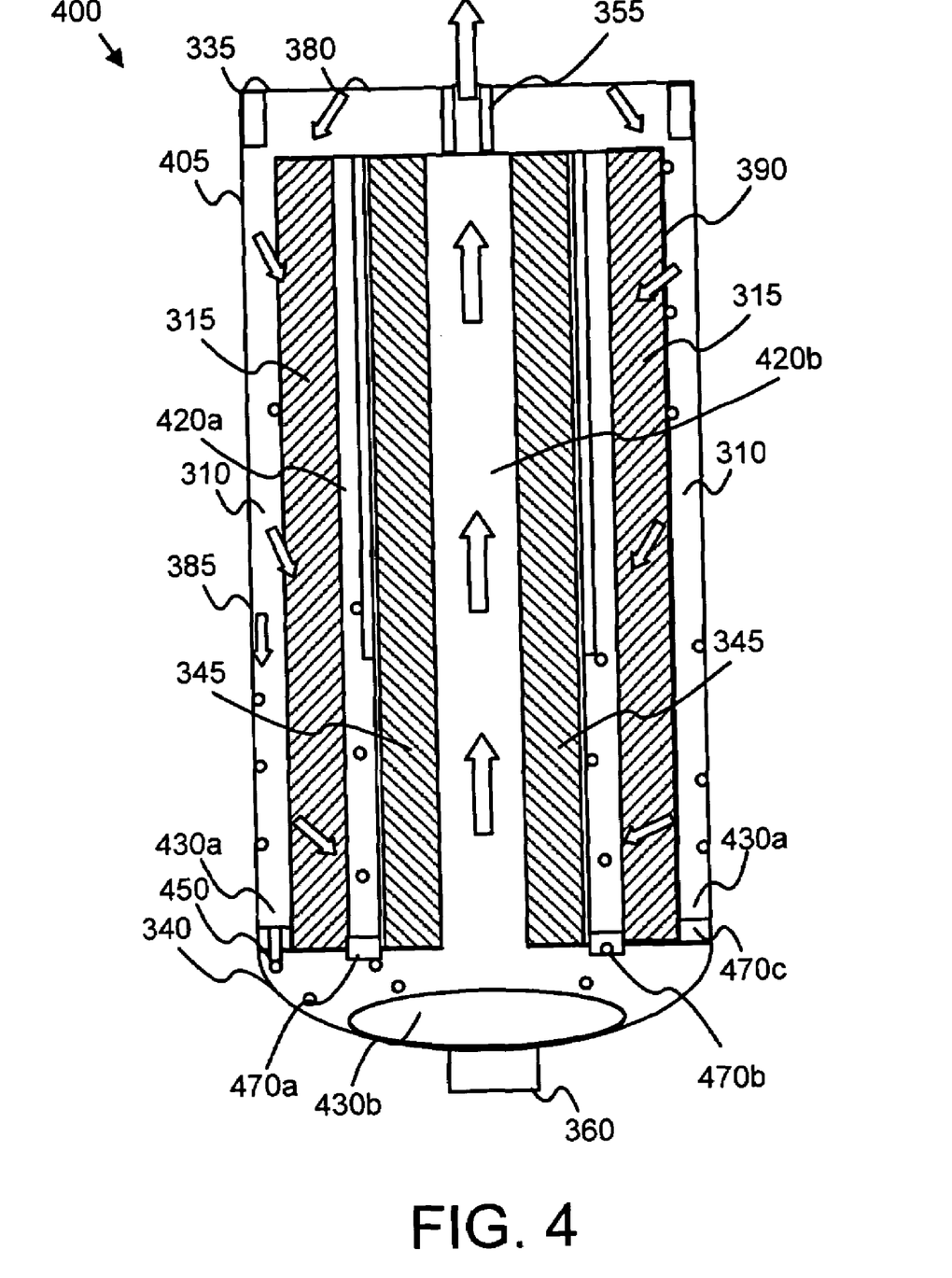
FIG. 4 is a schematic block diagram illustrating one embodiment of an outside/inside FWS of the present invention.

FIG. 4 is a schematic block diagram illustrating one embodiment of an outside/inside FWS 400 of the present invention. The FWS 400 may be the FWS 110 of FIG. 1. As depicted the FWS 400 includes a filter housing 385 comprising a filter wall 405, a proximal end 335, and a distal end 340.

The proximal end 335 may comprise an intake port 380. The intake port 380 is configured to allow fuel to enter the FWS 400. For example, the low-pressure pump 115 of FIG. 1 may draw fuel from the fuel tank 105 of FIG. 1 to the intake port 380. The filter housing 385 may be sealed so that fuel may only enter the FWS 400 through the intake port 380 and an exit port 355.

The fuel flows into an outer cavity 310. The filter wall 405 and a first filter media 315 may form the outer cavity 310. The fuel further flows from the outer cavity 310 through a first filter media 315. The first filter media 315 may have a multi-layer structure, with one or more layers of filtering media material. In addition, the first filter media 315 may comprise a first separation layer 205 and a coalescing layer 210 such as the first separation layer 205 and coalescing layer 210 of FIG. 2. The coalescing layer 210 may be physically laminated to the first separating layer 205.

The first separation layer 205 separates or repels first water droplets from the fuel flow as the fuel passes through the first filter media 315. Gravity may motivate the separated first water droplets to flow down the first filter media 315 to a first sedimentation chamber 430a. In one embodiment, a drain 450 removes the first water droplets from the first sedimentation chamber 430a into a second sedimentation chamber 430b. A drain port 360 may drain the collected water from the FWS 400. The drain port 360 may be the drain port 360 of FIG. 3.

As the fuel flows through the first filter media 315, the coalescing layer 210 may coalesce fine water droplets in the fuel flow into second water droplets. The fuel and the coalesced second water droplets may pass through the first filter media 315 to a first inner cavity 420a. The fuel flow passes from the first inner cavity 420a through a second filter media 345. The second filter media 345 includes a second separation layer 215 such as the second separation layer 215 of FIG. 2. In one embodiment, the second filter media 345 also includes a coalescing layer 210. The second separation layer 215 separates the coalesced second water droplets from the fuel flow by repelling the second water droplets. Gravity may motivate the separated second water droplets down the second filter media 345 to the first sedimentation chamber 430a.

In one embodiment, a sedimentation chamber barrier 470 allows water droplets to pass from the outer cavity 310 and first inner cavity 420a to the second sedimentation chamber 430b. The sedimentation chamber barrier 470 may comprise a porous, fibrous, hydrophilic material. In a certain embodiment, the sedimentation chamber barrier 470 forms a gasket preventing fuel from flowing from the outer cavity 310 and the inner cavities 420.

The fuel flow passes through the second filter media 345 into a second inner cavity 420b. In addition, the fuel flow may exit the FWS 400 through the exit port 355. The FWS 400 removes water from the fuel flow by separating first water droplets, coalescing fine water droplets into second water droplets, and separating the second water droplets.

In one embodiment, the first filter media 315 and the second filter media 345 comprise a filter element 390. The filter element 390 and filter housing 385 may comprise a disposable unit. In an alternate embodiment, the filter housing 385 may be unsealed and the filter element 390 removed from the filter housing 385. The filter element 390 may be configured as a replaceable cartridge.

Although the FWS 400 is depicted with the first and second filter media 315, 345, the FWS 400 may employ any number of filter media 315. For example, the FWS 400 may comprise two or more filter media 315, each comprising a separation layer 205. In addition, each filter media 315 may comprise a coalescing layer 210. The filter media 315 may be disposed as concentric cylinders, with the fuel flow entering the outermost filter media 315 and progressing inward through each filter media 315. In an alternate embodiment, the fuel flow may enter the innermost filter media 315, and progress outward through the outer most filter-media 315.

Figure 5:
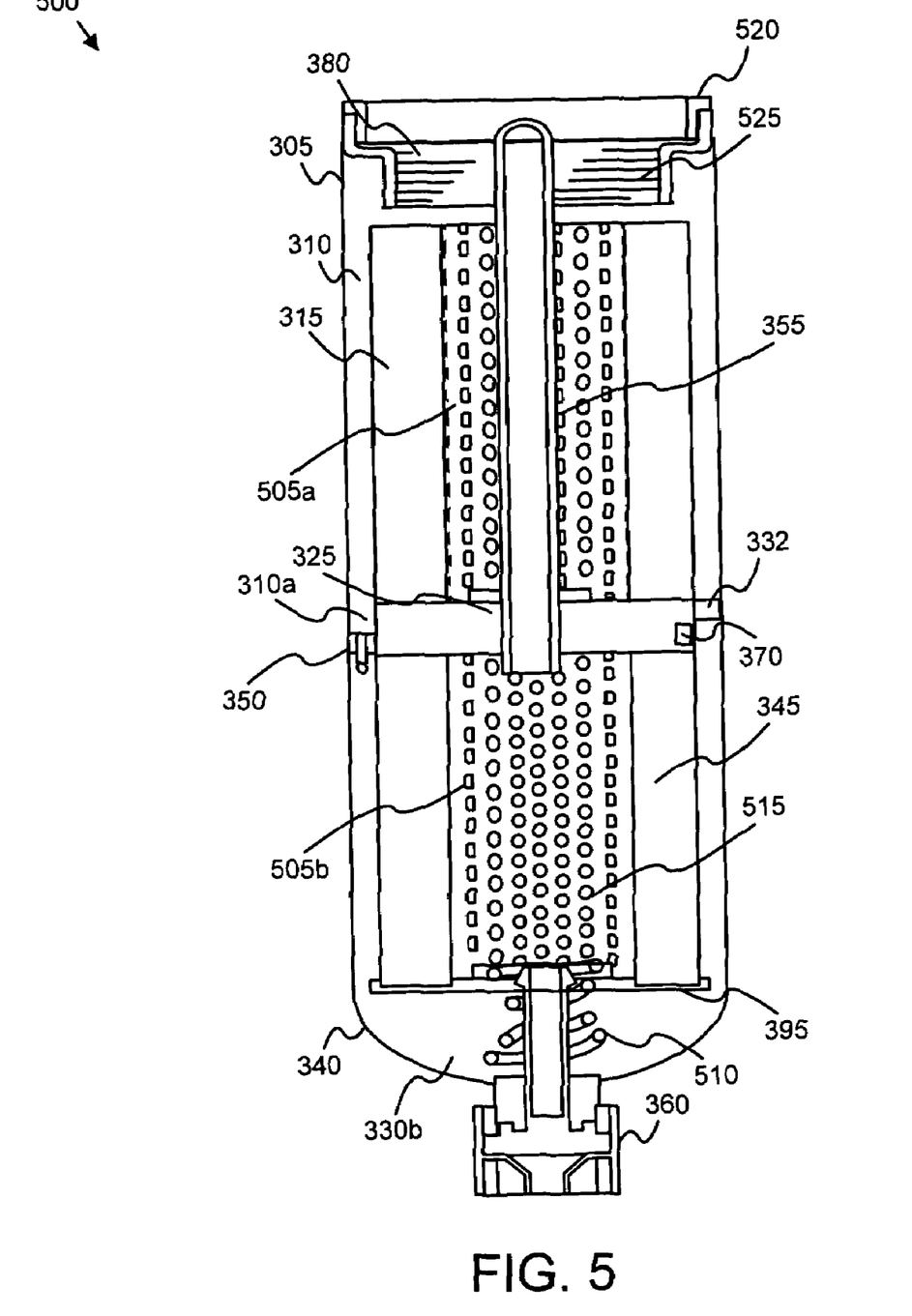
FIG. 5 is a schematic block diagram illustrating one alternate embodiment of a top/bottom FWS of the present invention.

FIG. 5 is a schematic block diagram illustrating one alternate embodiment of a top/bottom FWS 500 of the present invention. The FWS 500 may include the elements of the FWS of FIG. 3. In the depicted embodiment, a first screen 505a separates the first filter media 315 from the first inner cavity 320a. In addition, a second screen 505b separates the second filter media 345 from the second inner cavity 320b. In one embodiment, the first and second screen 505a, 505b comprise a plurality of orifices 515. The orifices 515 may allow the fuel to pass through the screen to the first and second inner cavities 320.

In one embodiment, the intake port 380 comprises a seal 520 and threads 525. The threads 525 allow the FWS 500 to be connected a fuel supply line connection. The fuel supply connection may deliver fuel from a fuel tank 105 such as the fuel tank of FIG. 1. The seal 520 may prevent leakage from the FWS 500. The fuel supply line connection may further comprise an exit connection for the exit port 355. The exit connection may deliver fuel to the low-pressure fuel pump 115 of FIG. 1.

In the depicted embodiment, the drain port 360 is configured to drain water from the distal end 340. In one embodiment, a spring 510 applies tension to the drain port 360 to prevent the release of water. Compressing the spring 510 may unseal the drain port 360 and allow the water to drain.

Figure 6A:
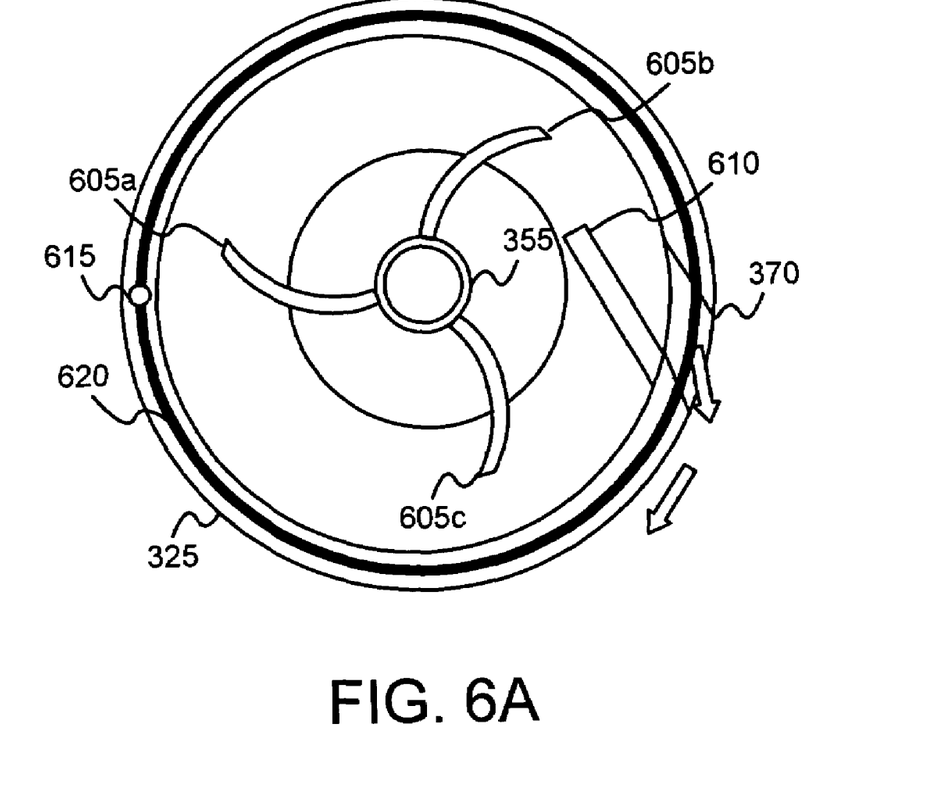
FIG. 6A is a top view of one embodiment of a centrifugal separator of the present invention.

FIG. 6A is a top view of one embodiment of a centrifugal separator 325 of the present invention. The centrifugal separator 325 may be the centrifugal separator 325 of FIGS. 3 and 5. In one embodiment, the centrifugal separator 325 comprises the exit port 355 of FIG. 3.

One or more blades 605 direct the fuel flowing into the first inner cavity 320a of the FWS 300 of FIG. 3 to flow circularly around exit port 355. The blades 605 may be angled or curved to motivate a circular flow. Although three blades 605 are depicted, any number of blades 605 may be employed. A shunt 610 directs the circular fuel flow from the centrifugal separator 325 through a tangential port 370. The fuel flow from the tangential port 370 is substantially tangential to the centrifugal separator 325 and so is substantially tangential to the filter wall 305 of FIG. 3.

In one embodiment, a groove 620 disposed on the centrifugal separator 325 collects separated water from the first outer cavity 310a of FIG. 3. The groove may be molded into the centrifugal separator 325. The first sedimentation chamber 330a of FIG. 3 may comprise the groove 620. The groove 620 may direct the collected water to a hole 615. The drain 365 of FIG. 3 may comprise the hole 615.

Figure 6B:
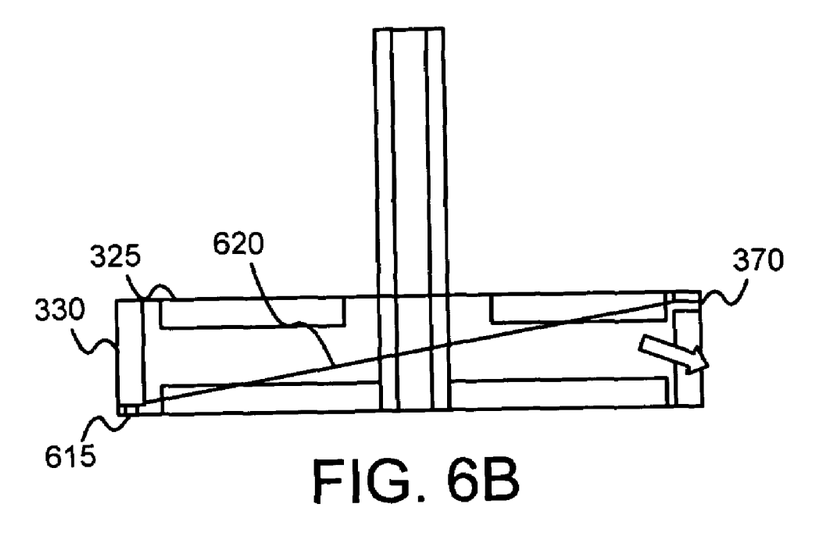
FIG. 6B is a side view of one embodiment of a centrifugal separator of the present invention.

FIG. 6B is a side view of one embodiment of a centrifugal separator 325 of the present invention. The centrifugal separator 325 may be the centrifugal separator 325 of FIGS. 3, 5, and 6A and may contain the elements of FIGS. 3, 5, and 6A. The side view illustrates the disposition of the groove 620 within the centrifugal separator 325. The groove 620 is depicted as angled to allow gravity to motivate water to flow to the hole 615. In addition, the groove 620 may be angled to allow fuel to pass through the tangential port 370 beneath the groove 620 while the hole 615 may still be in physical communication with the groove 620.

Figure 7:
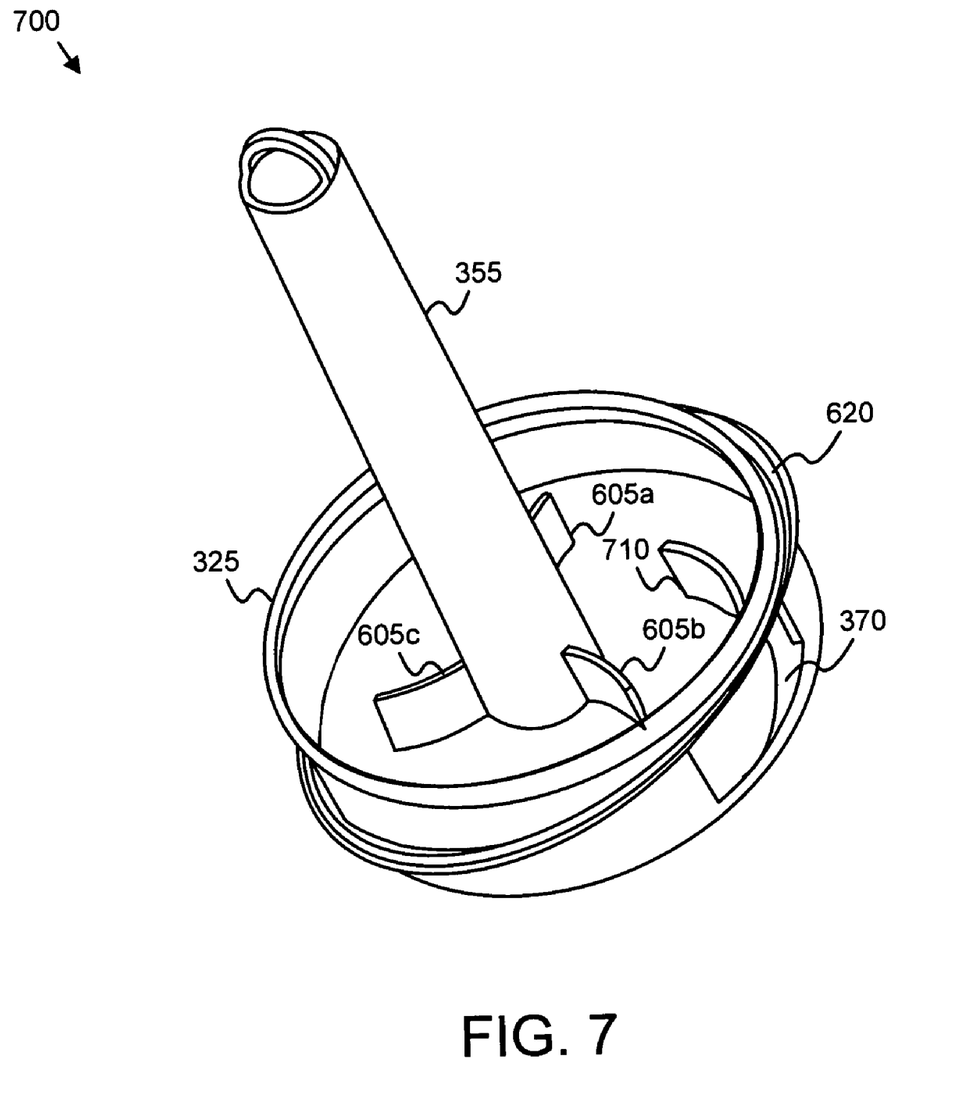
FIG. 7 is a perspective view of one embodiment of a centrifugal separator of the present invention.

FIG. 7 is a perspective view of one embodiment of a centrifugal separator 700 of the present invention. The centrifugal separator 700 may be the centrifugal separator 325 of FIGS. 3, 5, 6A, and 6B. The disposition of the groove 620 is shown relative to the tangential port 370. The groove 620 is depicted as passing over the tangential port 370 to separate collected water in the groove 620 from the tangential fuel flow from the tangential port 370.

Figure 8:
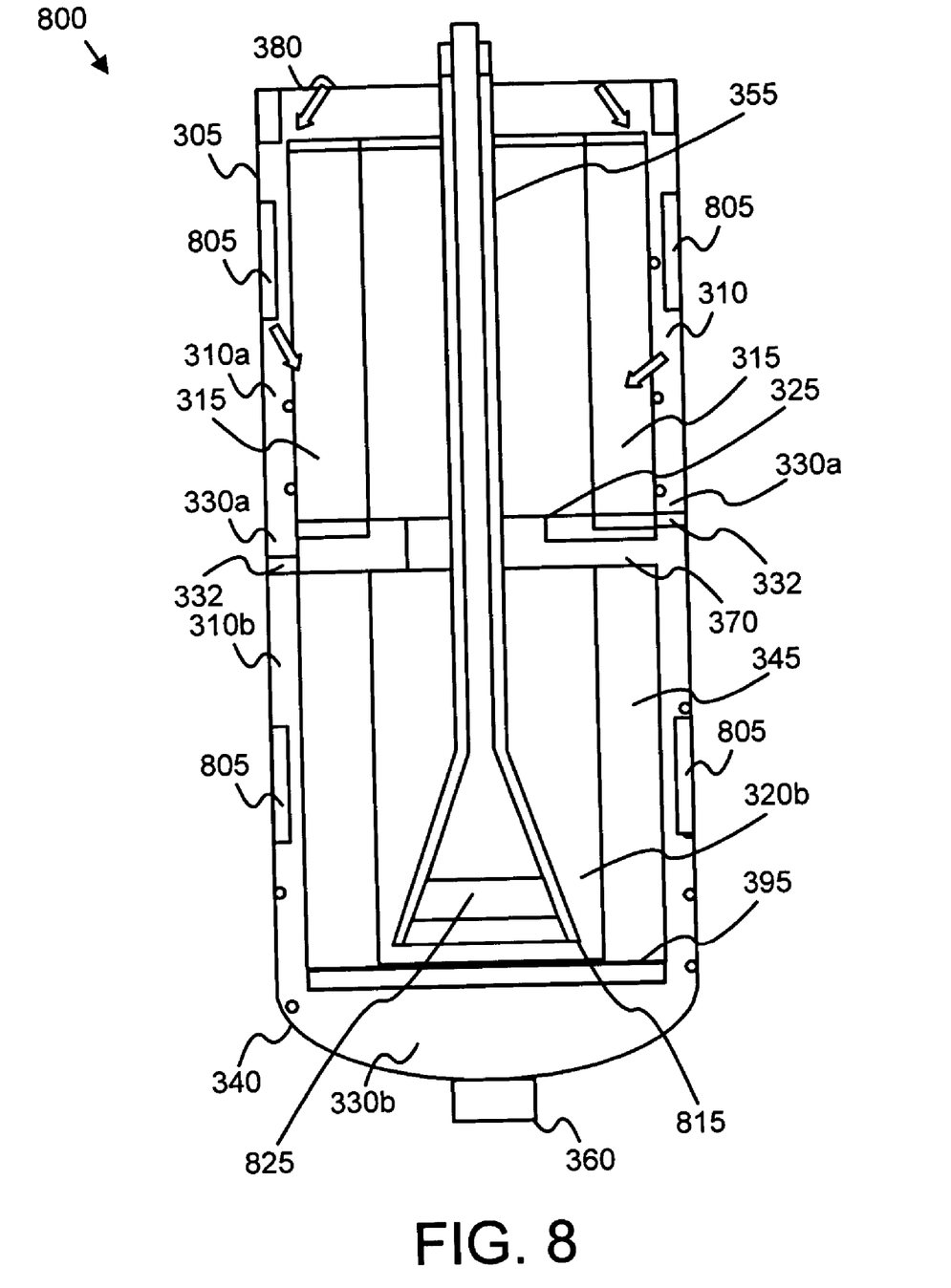
FIG. 8 is a schematic block diagram illustrating one embodiment of a funnel exit top/bottom FWS of the present invention.

FIG. 8 is a schematic block diagram illustrating one embodiment of a funnel exit top/bottom FWS 800 of the present invention. The FWS 800 adds additional elements to the FWS 300 of FIG. 3. The depicted FWS 800 includes one or more fins 805. The fins 805 may direct fuel entering the outer cavities 310 to circulate around the vertical axis of the FWS 800. The cyclonic motion of the fuel may separate water from the fuel.

The depicted FWS 800 further includes an exit funnel 815. The exit funnel 815 is configured to direct filtered fuel from the second inner cavity 320b to the exit port 355. In one embodiment, the exit funnel 815 includes a water barrier 825. The water barrier 825 may block water from entering the exit port 355 to prevent accidental ingestion of water by an engine 145 such as the engine 145 of FIG. 1. In one embodiment, the water barrier 825 comprises a matrix of open, porous, hydrophobic media.

Figure 9:
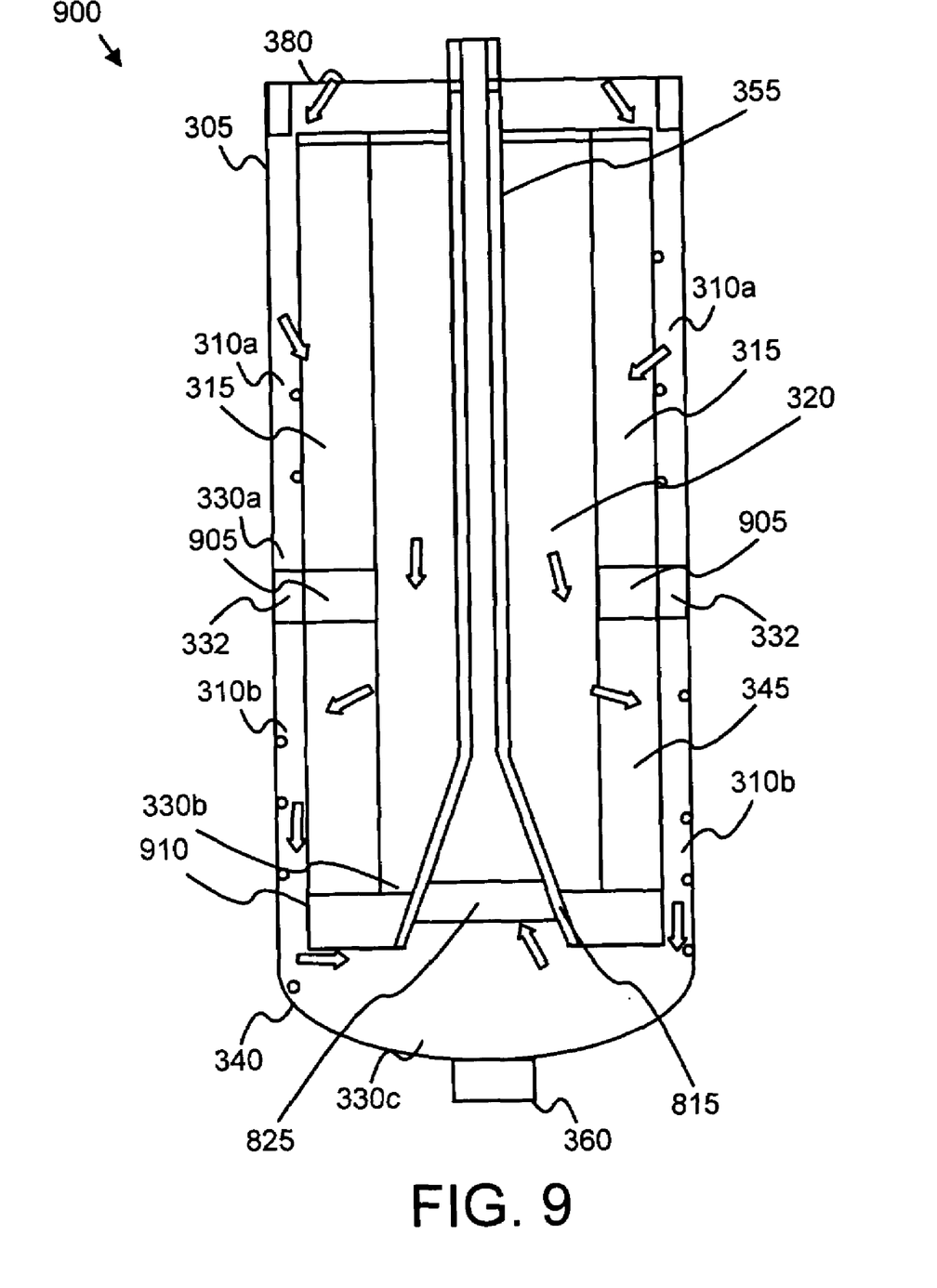
FIG. 9 is a schematic block diagram illustrating one embodiment of an outside-inside-out FWS of the present invention.

FIG. 9 is a schematic block diagram illustrating one embodiment of an outside-inside-out FWS 900 of the present invention. The FWS 900 adds additional elements to the FWS 300 of FIG. 3 including elements of the FWS 800 of FIG. 8. The fuel flows into a first outer cavity 310a. The filter wall 305 and a first filter media 315 may form the first outer cavity 310a. The fuel further flows from the first outer cavity 310a through the first filter media 315. In one embodiment, a first filter cartridge 365 comprises the first filter media 315. The first filter media 315 may have a multilayer structure, with one or more layers of filtering media material. In addition, the first filter media 315 may comprise a first separation layer 205 and a coalescing layer 210 such as the first separation layer 205 and coalescing layer 210 of FIG. 2.

The first separation layer 205 separates first water droplets from the fuel flow as the fuel passes through the first filter media 315. Gravity may motivate the separated first water droplets to flow down the first filter media 315 to a first sedimentation chamber 330a. The first sedimentation chamber 330a may drain the collected first water droplets from the first outer cavity 310a through a sedimentation chamber barrier 332.

As the fuel flows through the first filter media 315 to an inner cavity 320, the coalescing layer 210 coalesces fine water droplets in the fuel flow into second water droplets. The coalesced second water droplets may be more easily removed from the fuel flow. The fuel and the coalesced second water droplets may pass through the first filter media 315 to a first inner cavity 320a.

The fuel flow passes from the inner cavity 320 through a second filter media 345. Flow through the second filter media 345 is from inside to outside. A second filter cartridge 375 may comprise the second filter media 345. In addition, the second filter cartridge 375 may include an end cap 910. The second filter media 345 includes a second separation layer 215 such as the second separation layer 215 of FIG. 2. In addition, the second filter media 345 may include a coalescing layer 210. The second separation layer 215 separates the coalesced second water droplets from the fuel flow by repelling the second water droplets.

Gravity may motivate the separated second water droplets down the second filter media 345 to the second sedimentation chamber 330b. In one embodiment, the second sedimentation chamber 330b consists of the lower portion of the inner cavity 320. Water may drain from the second sedimentation chamber 330b to a third sedimentation chamber 330c.

The fuel flow passes from the inner cavity 320 through the second filter media 345 into a second outer cavity 320b. In addition, the fuel flow may flow from the second outer cavity 310a through an opening disposed in the end cap 910 and leave the depicted FWS 900 by means of an exit funnel or tube 825. The exit funnel 815 is configured to direct filtered fuel to the exit port 355. In one embodiment, the exit funnel 815 includes a water barrier 825. The water barrier 825 may block water from entering the exit port 355 to prevent accidental ingestion of water by an engine 145 such as the engine 145 of FIG. 1.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Additionally, the order in which a particular method occurs may or may not strictly adhere to the order of the corresponding steps shown.

Figure 10:
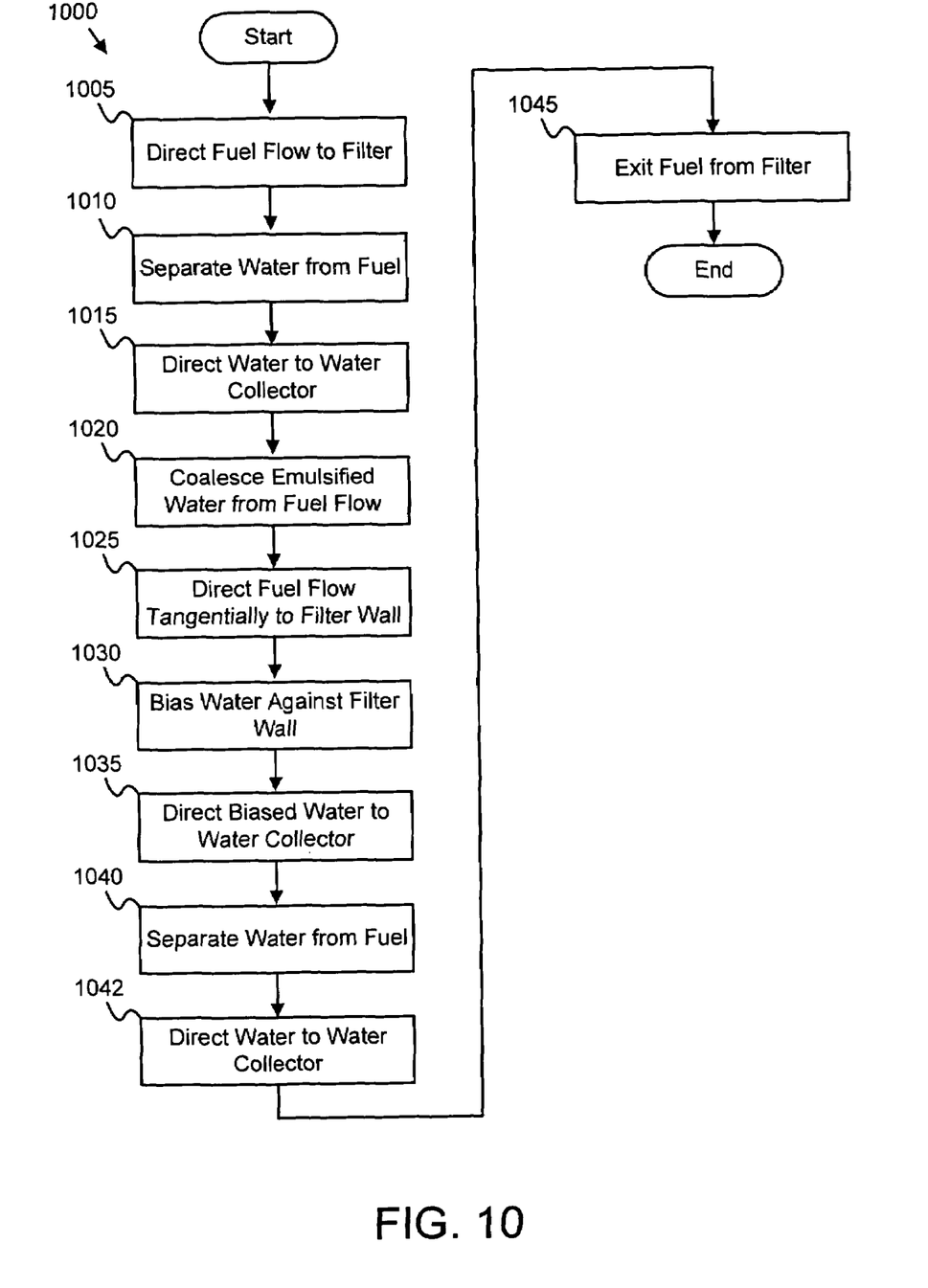
FIG. 10 is a schematic flow chart diagram illustrating one embodiment of a water separation method of the present invention.

FIG. 10 is a schematic flow chart diagram illustrating one embodiment of a water separation method 1000 of the present invention. The method 1000 substantially includes the steps necessary to carry out the functions presented above with respect to the operation of the described apparatus and systems of FIGS. 1-9. In addition, the method 1000 may employ the elements of FIGS. 1-9.

In one embodiment, an intake port 380 directs 1005 a fuel flow to a FWS 110. The filter may be the FWS 110, 300, 400, 500, 800, 900 of FIGS. 1, 3-5, and 8-9. In a certain embodiment, the fuel is diesel fuel drawn form a fuel tank 105. A first separation layer 205 separates 1010 water droplets from the fuel flow by repelling the water droplets. In one embodiment, the first separation layer 205 comprises a hydrophobic matrix. The first separation layer 205 may further direct 1015 the separated water to a sedimentation chamber 330. In one embodiment, the first separation layer 205 may direct 1015 the separated water to a first sedimentation chamber 330a.

In one embodiment, a coalescing layer 210 coalesces 1020 fine water droplets from the fuel flow. The fine water droplets may have escaped separation 1010 by the first separation layer 205 because of small size. In a certain embodiment, the coalescing layer 210 comprises a hydrophilic matrix. In an alternate embodiment, the coalescing layer 210 comprises an intermediate wetting matrix.

In one embodiment, a centrifugal separator 325 directs 1025 the fuel flow tangentially to a filter wall 305. The centrifugal force of the centrifugal separator 325 tangentially directing 1025 fuel flow along the filter wall 305 biases 1030 water droplets from the fuel flow, separating the water droplets from the fuel flow. The filter wall 305 may direct 1035 the separated water droplets to a sedimentation chamber 330 such as the second sedimentation chamber 330b of FIG. 3.

A second separation layer 215 separates 1040 the coalesced water droplets from the fuel flow. In one embodiment, the second separation layer 215 may direct 1042 the water droplets to the second sedimentation chamber 330b. An exit port 355 may remove 1045 the filtered fuel from a FWS 110 and the method 1000 terminates.

Figure 11:
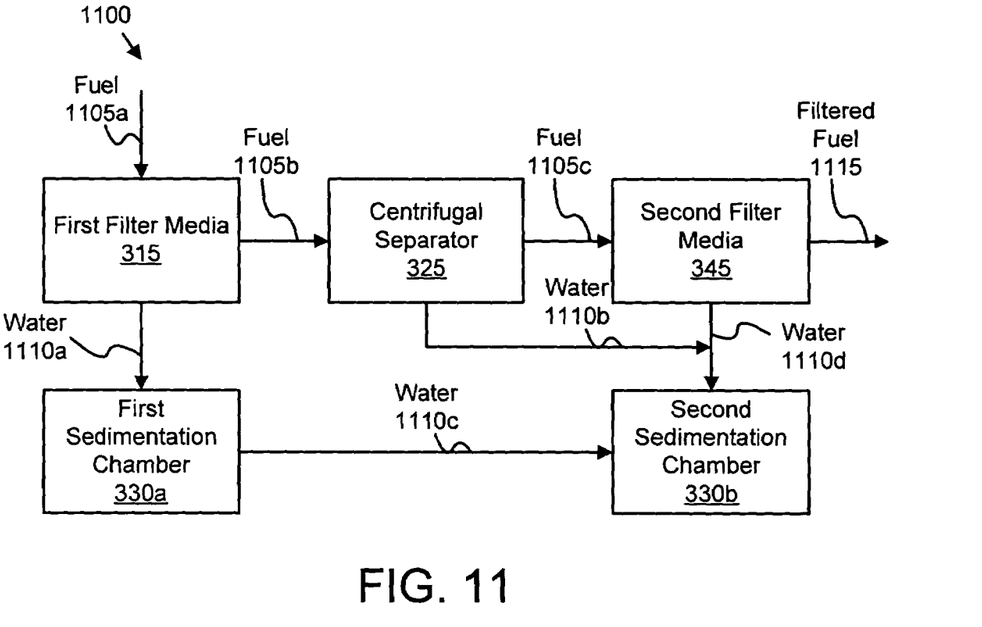
FIG. 11 is a schematic flow diagram illustrating one embodiment of a water separation process flow of the present invention.

FIG. 11 is a schematic flow diagram illustrating one embodiment of a water separation process flow 1100 of the present invention. The process flow 1100 may employ the elements of FIGS. 1-9 and the method 1000 of FIG. 10. In one embodiment, fuel 1105a is directed 1005 to a first filter media 315 of a FWS 110. The first filter media 315 separates 1010 water 1110a from the fuel 1105a. In addition, the first filter media 315 may direct 1015 the water 1110a to a first sedimentation chamber 330a. The fuel 1105b passes from the first filter media 315 to a centrifugal separator 325. The centrifugal separator 325 biases 1030 water droplets against a filter wall 305, separating water 1110b from the fuel 1105b. The filter wall 305 may direct 1035 the water 1110b to a second sedimentation chamber 330b.

In one embodiment, the fuel 1105c passes from the centrifugal separator 325 through the second filter media 345. The second filter media 345 separates 1040 water 1110d from the fuel 1105c, directing 1042 the separated water 1110d to the second sedimentation chamber 330b. In addition, filtered fuel 1115 may exit 1045 the FWS 110. In one embodiment, water 1110c from the first sedimentation chamber 330a drains to the second sedimentation chamber 330b.

The present invention separates water from a fuel flow by separating first water droplets from the fuel flow and separating second water droplets. The addition, the present invention may separate water with a reduced FWS 110 volume. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to separate water, the apparatus comprising:
    a first separation layer configured to separate first water droplets from a fuel flow by repelling the first water droplets;
    a coalescing layer communicable in fuel receiving communication with the first separation layer, the coalescing layer configured to coalesce fine water droplets in the fuel flow into second water droplets; and
    a second separation layer communicable in fuel receiving communication with the coalescing layer, the second separation layer being configured to separate the second water droplets from the fuel flow by repelling the second water droplets.

2. The apparatus of claim 1, wherein the coalescing layer is downstream from the first separation layer in the fuel flow.

3. The apparatus of claim 1, wherein the first separation layer is physically laminated to the first coalescing layer in a multilayer structure of filter media.

4. The apparatus of claim 1, wherein the fuel flow further passes from a first outer cavity through the first separation layer and the first coalescing layer to an inner cavity, further passing from the inner cavity through the second separation layer to a second outer cavity.

5. The apparatus of claim 1, wherein the coalescing layer is selected from a hydrophilic matrix and an intermediate wetting matrix.

6. The apparatus of claim 5, further comprising a second coalescing layer physically laminated to the second separation layer in a multilayer structure of filter media configured to coalesce fine water droplets.

7. The apparatus of claim 1, further comprising a first sedimentation chamber configured to collect the separated first water droplets.

8. The apparatus of claim 7, further comprising a second sedimentation chamber configured to collect the separated second water droplets.

9. The apparatus of claim 8, wherein the second sedimentation chamber is disposed in the fuel flow between the first and second separation layer.

10. The apparatus of claim 8, further comprising a drain configured to direct water from the first sedimentation chamber to the second sedimentation chamber.

11. The apparatus of claim 1, further comprising a filter having a filter wall, wherein the first and second separation layers are positionable within the filter and spaced apart from the filter wall, the apparatus further comprising a centrifugal separator positioned between the first and second separation layers and configured to direct the fuel flow tangentially toward the filter wall.

12. The apparatus of claim 11, further comprising a sedimentation chamber configured to collect the separated second water droplets, wherein the tangential fuel flow centrifugally biases water droplets against the filter wall, the filter wall configured to direct the water droplets to a sedimentation chamber.

13. The apparatus of claim 12, wherein the first separation layer is comprised by a first filter cartridge, the second separation layer is comprised by a second filter cartridge, and the centrifugal separator comprises an outside perimeter, the centrifugal separator being disposed along a fuel flow path defined between the first filter cartridge and the second filter cartridge, wherein the outside perimeter of the centrifugal separator seals between the first filter cartridge and the second filter cartridge.

14. The apparatus of claim 1, wherein the separation layers are comprised of a hydrophobic matrix.

15. The apparatus of claim 1, wherein the first separation layer and the second separation layer form concentric cylinders.

16. The apparatus of claim 15, wherein the fuel flow passes from an outer cavity through the first separation layer to a first inner cavity and through the second separation layer to a second inner cavity.

17. The apparatus of claim 1, wherein the fuel flow passes from a first outer cavity through the first separation layer to a first inner cavity, further passing from the first inner cavity to a second outer cavity and through the second separation layer to a second inner cavity.

18. The apparatus of claim 1, wherein the fuel flow further passes from a first outer cavity through the first separation layer to an inner cavity, further passing from the inner cavity through the second separation layer to a second outer cavity.

19. The apparatus of claim 1, wherein the first separation layer and the second separation layer are configured to provide two-stage filtration by retaining contaminants.

20. The apparatus of claim 1, further comprising an exit port configured to direct the fuel flow from the apparatus.

21. The apparatus of claim 20, further comprising at least one sedimentation chamber configured to collect the separated first and second water droplets, wherein the exit port comprises a tube configured to transport the fuel flow from the vicinity of the the at least one sedimentation chamber.

22. The apparatus of claim 21, wherein the exit port comprises a funnel coupled to the tube, the funnel being configured to collect fuel from the fuel flow and direct the collected fuel into the tube.

23. The apparatus of claim 22, wherein the funnel further comprises a water barrier configured to block water.

24. A system to separate water, the system comprising:
a filter element comprising:
   a first filter cartridge configured to separate first water droplets from a fuel flow by repelling the first water droplets;
   a second filter cartridge configured to separate second water droplets from the fuel flow by repelling the second water droplets; and
   a coalescing layer between the first filter cartridge and the second filter cartridge, the coalescing layer configured to coalesce fine water droplets passing through the first filter cartridge into the second water droplets; and
a filter housing configured to sealably retain the filter element and to direct the fuel flow through the filter element.

25. The system of claim 24, wherein the coalescing layer is laminated to the first filter cartridge.

26. The system of claim 24, wherein the coalescing layer is laminated to the second filter cartridge.

27. The system of claim 24, the filter element further comprising a centrifugal separator configured to direct the fuel flow tangentially to a filter wall of the filter housing wherein the tangential fuel flow centrifugally biases the second water droplets against the filter wall, the filter wall configured to direct the second water droplets to a second sedimentation chamber.

28. The system of claim 24, wherein the filter housing and filter element comprise a disposable unit.

29. The system of claim 24, wherein the filter housing may be unsealed allowing the removal of the filter element and wherein the filter element comprises a replaceable cartridge.

30. The system of claim 24, wherein the filter housing is configured as a disposable spin-on filter.

31. The system of claim 24, wherein the filter housing is configured as a permanent filter housing and lid.

32. A method for multistage water separation, the method comprising:
separating first water droplets from a fuel flow by repelling the first water droplets;
coalescing fine water droplets in the fuel flow into second water droplets; and
separating the second water droplets from the fuel flow by repelling the second water droplets.

33. The method of claim 32, wherein a matrix selected from a hydrophilic matrix and an intermediate wetting matrix coalesces the water droplets.

34. The method of claim 32, further comprising directing the fuel flow tangentially to a filter wall.

35. The method of claim 34, further comprising biasing the second water droplets of the fuel flow against the filter wall and directing the water droplets to a sedimentation chamber.

36. The method of claim 32, wherein a hydrophobic matrix separates the water droplets.

* * * * *